United States Patent Office 3,215,036
Patented Nov. 2, 1965

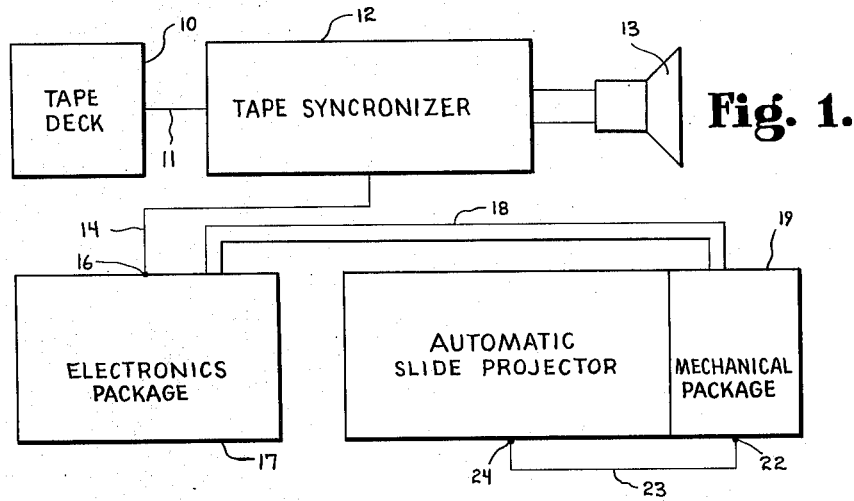
Fig. 1.
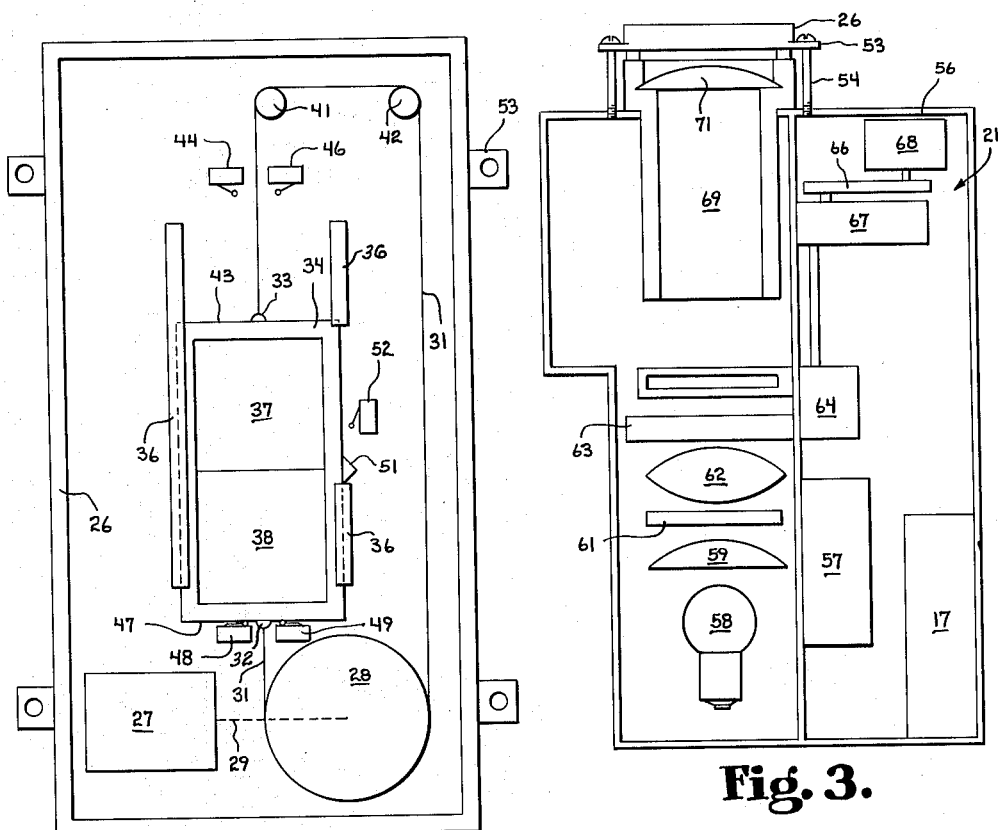
Fig. 2.
Fig. 3.
INVENTOR.
THOMAS W. KIRKCONNELL
BY CHARLES D. TOLSON
Lockwood, Woodard, Smith & Weikart
Attorneys Nov. 2, 1965   T. W. KIRKCONNELL ETAL   3,215,036
SLIDE PROJECTOR WITH SHIFTABLE FILTERS
Filed Feb. 15, 1962   2 Sheets-Sheet 2
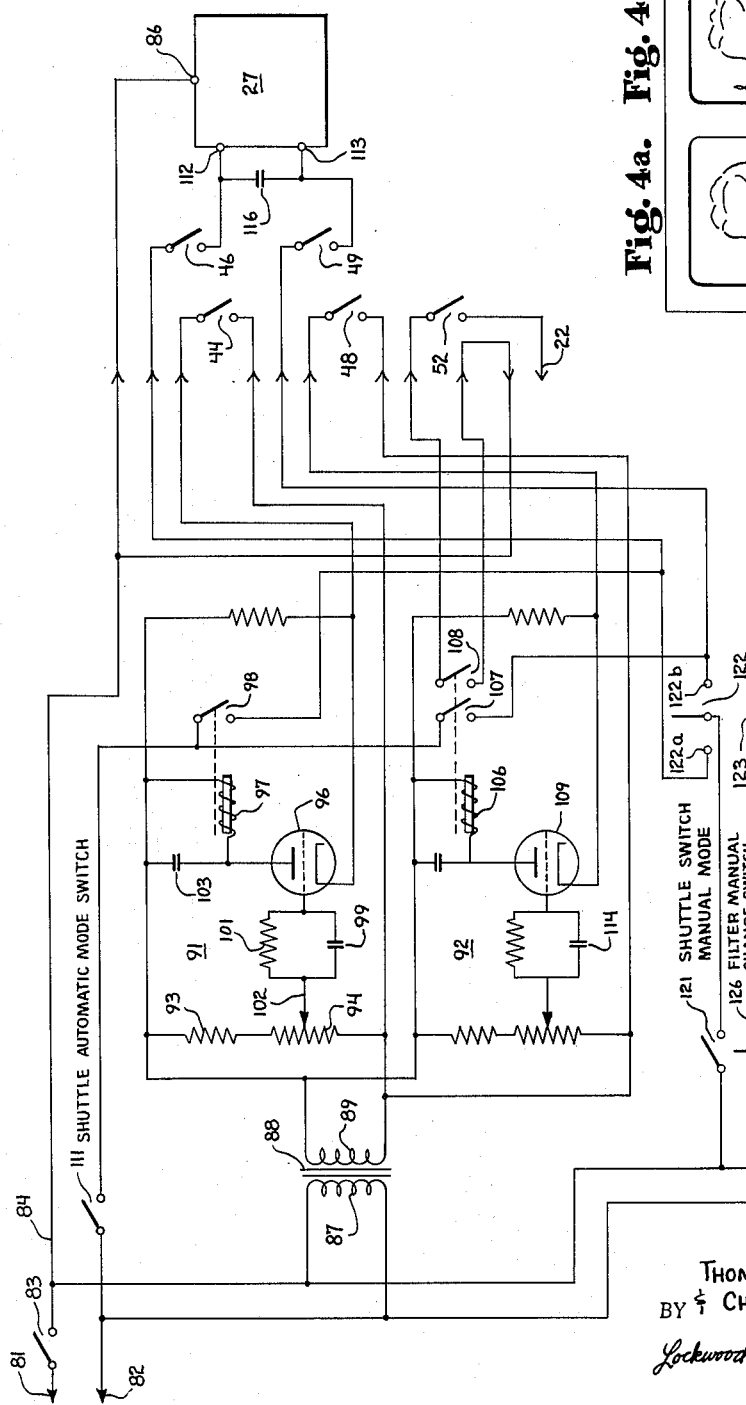

3,215,036
SLIDE PROJECTOR WITH SHIFTABLE FILTERS
Thomas W. Kirkconnell, Vincennes, Ind. (444 W. Argonne, Kirkwood, Mo.), and Charles D. Tolson, Vincennes, Ind. (607 Greene St., Cumberland, Md.)
Filed Feb. 15, 1962, Ser. No. 173,506
7 Claims. (Cl. 88—28)

This invention relates generally to projection systems and particularly to a system wherein a slide projector projects light from slides having images thereon which, when illuminated, produce light having different optical characteristics. The light thus produced is projected and filtered, with provision being made for automatic filter changing to produce separately on a viewing screen the images present on the slides.

In audio-visual education, it is common practice to employ sound movies in which a conventional film with sound track thereon is used in a projector with sound producing capabilities. As discussed in our copending application entitled "Educational Projection Apparatus," Serial No. 80,182, filed January 3, 1961, now Patent No. 3,146,663 issued September 1, 1964, disadvantages of conventional practice are the requirement of expensive equipment and the fact that sound movies cannot readily be interrupted to study specific portions thereof. The aforementioned application discloses apparatus affording a partial solution to the problem. However, there remained to be devised means whereby a still more significant reduction in cost of equipment could be achieved and whereby equipment already available and in the possession of educational institutions and private persons themselves could be used. There also remained need for a system which could readily be programed in advance, both as to the visual portion and audio portion, together with provision for automatic presentation if desired.

It is therefore a general object of the present invention to provide improved means for audio-visual education.

It is a further object of the present invention to provide audio-visual means wherein two distinct images are separately reproduceable on a projection screen, from a single slide.

It is a further object of the present invention to provide means whereby the foregoing objects can be achieved with conventional projection apparatus by provision of inexpensive supplementary elements in combination therewith.

It is a further object of the present invention to provide means for achieving the foregoing objects and which can be programed automatically in advance both as to the audio and visual simultaneous presentation, but which can readily be controlled to interrupt an automatic presentation for prolonged consideration of an individual slide or a portion thereof and discussion thereof.

Described briefly, a typical embodiment of the present invention includes an automatic slide projector having a remote control input whereby electrical signals are useful to effect a change of slides therein. The projector is equipped with an attachment in front of the objective lens thereof and which includes a pair of filters mounted on a shuttle, and which also includes a motor to reversibly drive the shuttle. Thereby, the filters may alternately be disposed between the objective lens of the projector and a projection screen whereby they can filter the light flowing from the projector. Of course, the scope of the invention is not limited to the mounting of the filters in a shuttle as they could, if desired, be mounted in a rotatable member, for example.

Each slide in the projector is provided with two separate images. One image is capable of transmitting light of one character filterable by one of the two filters and the other image is capable of transmitting light of a different character filterable by the other filter. Accordingly, the image projected onto a viewing screen from a given slide may be alternatively changed by shuttling filters without changing the slide.

An electronic control package is coupled to the projector and to the filter attachment whereby the output of the control package can be employed to control operation of filters and changing of slides. The electronic control package is provided with an input coupled to a tape synchronizer and tape deck or combination thereof to obtain signals whereby the projection of slides and control of the filters may be programed in advance automatically. A simultaneous sound output is available from the tape synchronizer to correspond with the control package signals produced thereby.

The full nature of the invention will be understood from the accompanying drawings and the following description and the claims:

FIG. 1 is a block diagram of the system according to the present invention.

FIG. 2 is a schematic illustration of an attachment for the projector and including the filters.

FIG. 3 is a top schematic view of a projector incorporating the present invention.

FIG. 4 is divided into two sections, FIG. 4a and FIG. 4b, which are exemplary of a typical form of educational material which may be used according to the present invention.

FIG. 5 is a schematic diagram of the electronic control package and its electrical couplings with the filter attachment according to the present invention, and providing the necessary input and output leads for combination with the system of FIG. 1.

Referring to FIG. 1, a tape deck 10, which may be commercially available equipment, has an output 11 coupled to the input of the tape synchronizer 12 which also may be commercially available equipment. A sound output from the tape synchronizer is designated by the speaker 13. A signal output line 14 is coupled to the signal output terminal from the tape synchronizer to the remote control input terminal 16 of the electronics package 17 of the present invention. Electrical coupling by cable 18 is provided between the electronics package and the mechanical package incorporating the filter assembly 19 and mounted to the front of projector 21. The signal output terminal 22 of the filter package is coupled through the signal line 23 to the remote control signal input 24 of projector 21.

It should be noted that all of the above mentioned equipment with the exception of the electronics package and mechanical filter packages may be selected from a variety of commercially available equipment. A separate tape deck and tape synchronizer are not essential inasmuch as a conventional stereo-tape recorder having appropriate signal output means may also be used.

Referring to FIG. 2, the filter assembly includes a housing 26 having a reversible motor 27 therein driving pulley 28 by means of the shaft 29. A cable 31 is passed over the pulley 28 and is connected between the anchors 32 and 33 of the shuttle 34 disposed between the guides 36. The shuttle includes a first filter 37 and a second filter 38. The filters may be of the color type, such as the Wratten green (No. 59) and Wratten red (No. 26), for example, or may be polarizing filters oriented in opposite directions, for example. Other suitable filtering means heretofore devised or hereafter devised could also be used within the scope of the present invention.

The cable 31 passes over the idler pulleys 41 and 42 pivotally mounted to the housing 26. Therefore, the shuttle can be moved up and down between the lower position, as shown, and an upper position thereof. In the upper position, the upper edge 43 of the shuttle closes the switches 44 and 46, and in the lower position of the shuttle as shown, the lower edge 47 thereof closes the switches 48 and 49. During passage between the positions, the cam 51 at the side of the shuttle momentarily closes the switch 52. The aforementioned switches may be microswitches if desired. It should be noted at this point, that if desired, some reversible energizing means other than a motor may be devised and incorporated within the scope of the present invention. Also, if desired, movement between one position and another may be energized by a motor or magnetic means, and return to the first position may be effected by a spring.

Referring to FIG. 3, the housing 26 is mounted by means of the tabs 53 and screws 54 to the front wall 56 of the projector 21. The projector may include a blower 57, and may enclose electronics package 17 of FIG. 1, if desired. Typically, it would include a lamp 58, lenses 59, 61 and 62, and a seat 63 upon which slides rest while in position for projection. It includes conventional slide changing mechanism 64 connected through conventional linkage 66 and gear box 67 to the slide changer motor 68. Typically, the projector also includes the projection lens 69, having an objective portion 71 from which light flows toward a projection screen (not shown). Light flowing from the objective 71 is filtered by one of the filters 37, 38 disposed in front of the objective at the time.

Referring to FIG. 4, there are two prints 76 and 77. Each of these has a picture thereon with an appropriate caption. This figure represents an example of a type of figures which can be employed on two halves of a slide. They can be superimposed by offset printing wherein one picture would include images thereon in magenta colored ink, and the other image would be provided in cyan. Assuming the picture 76 is in magenta, and assuming that the filters are Wratten green and red, when the red filter is in front of the objectives, the magenta image will not appear on the screen. On the other hand, if the image 77 is cyan, it will be projected to the screen and appear in black. With the green filter in front of the objective of the projector, the cyan image on the slide will not appear but the magenta image 76 will appear on the screen in black. As an alternative method, the two images 76 and 77 may be superimposed transparencies having different polarization directions. Therefore, using a pair of oppositely polarized filters instead of colored filters, one of the images will be produced when the filters are in one disposition, and the other image will be produced when the other filter is located in front of the objective of the projector. By changing the filters while projecting a given slide, semi-animation or title changes can be effected if desired.

Referring to FIG. 5, a source of electrical energy may be considered connected across the input terminals 81, 82. Input terminal 81 is connected through the off-on switch 83 and the line 84 to one terminal 86 of the reversible motor 27. It is also connected to one side of the primary winding 87 of transformer 88, the other side of which is connected to input terminal 82. The secondary winding 89 of transformer 88 is coupled across a first control circuit 91 and a second control circuit 92, both of which are timer circuits similar to those disclosed in the aforementioned application. Control circuit 91 includes the serial combination of resistance 93 and tap resistance 94 connected across the secondary 89 of the transformer 88. Triode 96 has its anode coupled through the winding 97 of solenoid switch 98 to the one side of winding 89. The cathode of triode 96 is coupled through switch 44 to the other side of winding 89. The plate circuit of the triode is, therefore, normally open whenever the microswitch 44 is open. The grid of triode 96 is connected through the capacitor 99 and resistor 101 in parallel, to the variable tap 102 of the tapped resistance or potentiometer 94. A capacitor 103 is connected across the solenoid winding 97.

The operation of the control circuit 91 commences when the microswitch 44 is closed by arrival of the shuttle 34 of FIG. 2 in the first, or uppermost position. When a sufficient charge has accumulated on the capacitor 99, triode 96 will begin to conduct. Thereupon the solenoid switch 98 is closed and will remain closed until the release thereof by de-energization of the winding 97. The purpose of switch 98 will become apparent as the description proceeds. Suffice it to say at this point that winding 97 will not become de-energized until switch 44 has been opened and capacitor 103 parallel to the winding 97 discharges.

Timer circuit 92 is identical to circuit 91. However, the solenoid winding 106 of the solenoid operated switches 107 and 108 operates a pair of contacts just mentioned rather than a single contact as is the case of winding 97 of timer circuit 91. Triode 109 of circuit 92 has its cathode coupled through the microswitch 48 to one side of the secondary winding 89. Therefore, this circuit is energized only when the switch 48 is closed, which occurs when the shuttle 34 of FIG. 2 is in the lower or down position as shown in FIG. 2. The operation of timer circuit 92 is the same as that of timer circuit 91.

Referring further to FIG. 5, a shuttle automatic mode control switch 111 is connected between the input terminal 82 and the movable contactor of solenoid operated switch 98 of solenoid operated switch 107. The fixed contactor of switch 98 is connected to switch 46 which, when it is closed, connects switch 98 to the forward operation terminal 112 of motor 27. Thus, when the first timer circuit 91 closes switch 98, if the shuttle automatic mode switch 111 is closed at the time, motor 27 will drive the shuttle in forward direction or down. This is the operation desired, of course, because switch 46 is closed when the shuttle is up and the next position desired for the shuttle from the up position is down.

In the down position of the shuttle, in addition to closing the switch 48 and thereby energizing the timing circuit 92, the shuttle also closes switch 49. The switch 107 operated by the solenoid of the timer circuit 92 is connected through the switch 49 to the reverse direction operation terminal 113 of the motor 27. Therefore, after the capacitor 119 of the second timer circuit has charged adequately, and triode 109 begins to conduct, the switch 107 is closed whereupon terminal 113 of the motor 27 is connected to the input terminal 82 and drives the shuttle in the reverse direction, or upward to its original position. Capacitor 116 across the motor terminals keeps the motor energized for the short time during the shifting operation which is necessary after the switch completing the circuit thereto and initiating operation of the motor is opened by movement of the shuttle away from it.

It will also be observed, that energization of the winding 106 of the solenoid switch of timing circuit 92 closes the switch 108 thereof. The fixed contact of this switch is connected to the energy input line 84. The movable contact thereof is connected through the switch 52 to the output terminal 22. It will be recalled that in the description of FIG. 1, it was said that this output terminal is coupled to the remote control slide changer input of the automatic slide projector. Therefore, when the timer circuit 92 closes switches 108 and 107, the switch 107 causes the shuttle to move upwardly to the first position. Cam 51 of FIG. 2 activates switch 52 during transfer of the shuttle between the lower and upper positions, whereby energy input from line 84 is coupled through switch 108 and switch 52 of FIG. 5 to the output terminal 22 thereof and from there to the slide changer signal input 24 of the slide projector. Therefore, during movement of the shuttle from the lower to the upper position, a slide change is effected. It is apparent, therefore, that a slide change is effected for every other change of the filter.

In order to provide for filter changing either by manual operation of a change button or according to input signals from the tape deck of FIG. 1, the shuttle automatic mode control switch 111 is opened. The shuttle manual mode switch 121 is closed whereby the movable contactor of the switch 122 is connected to the input terminal 82. Switch 122 is operable by the solenoid 123 having winding 124 thereon. Each energization of winding 124 will cause the movable contactor of switch 122 to move to either the fixed contact 122a or the fixed contact 122b thereof. The movable contactor will always be connected with one or the other of the two fixed contactors.

Contactor 122a is connected through switch 46 to the terminal 112 of motor 27. Contactor 122b is connected through the switch 49 to the terminal 113 of motor 27. Therefore, with the switch 121 closed and switch 122 making a circuit with motor terminal 112, the shuttle will be caused to go down. Alternatively, if switch 122 makes a circuit with the terminal 113 of motor 127, the shuttle will be driven up by the motor. It should be noted, of course, that the respective switch 46, or 49, must be closed in order for the motor to be actuated by switch 122.

The condition of switch 122 can be changed, as was previously mentioned, by energization of the winding 124. One side of this winding is connected directly to input terminal 82. The other side of the winding is connectable through the manual change button 126 to the input terminal 81. Therefore, by operating the manual change button 126 the shuttle can be caused to move up or down from the position in which it rests when the button is depressed.

It will be observed, that remote input terminals 16a and 16b are connected to each side of the switch 126. These input terminals correspond to the input 16 in FIG. 1. Therefore, when a signal from the tape deck and tape synchronizer provides in effect a closed circuit across the terminal 16a–16b, a shuttle change will be effected due to the energization of the winding 124. Therefore, it is apparent that by use of the switch 122, shuttle changes can be effected by operation of the manual shuttle change button 126 or by receipt of an appropriate signal from the tape synchronizer at the input 16. The changes of the slide in the projector for every other shuttle change, are effected in the same manner as has already been described with reference to the control timer circuits.

It will be recognized from the foregoing, that practically any automatic or semi-automatic slide projector and tape player can be combined according to the present invention. Incorporating the apparatus herein disclosed and employing slides according to FIG. 4, the transition from conventional amusement equipment to effective educational apparatus can be achieved quite readily. It is contemplated that the filter assembly and electronics package may most conveniently be provided in separate packages or in a combined unit for mounting to the projector.

In the use of the present invention, the automatic slide projector is loaded with a tray of slides having information thereon in a form already described herein. The tape deck, tape synchronizer, electronics package and filter assembly, and slide projector are interconnected as shown in FIG. 1. The slide projector controls are set for semi-automatic, or push-button operation.

The electronics package of the present invention is turned on and set in the manual position, if the lock-step classroom projection phase is to be provided. The tape is placed on the tape deck and is started. As signals come from the tape, the first slide will be projected, with the first half of the slide being viewed. The next signal from the tape will cause the filters to move in the mechanical unit but will not cause the slide to change, whereby the second half of the slide may be viewed. The next signal from the tape will cause the filters to move again but this time the slide projector will also cycle and the first half of the next slide will be viewed. Thus the process will continue with information recorded on the tape controlling the scenes being viewed. At the same time, a commentary derived from the tape may be obtained from the speaker coupled to the tape synchronizer.

However, the teacher is not a slave to this system. If he wishes to review one particular slide, he need only stop the tape, disconnect the remote control cable from the projector, and push the filter change button on the electronics package to move the filters. By disconnecting the remote control cable from the projector, he avoids automatic slide change for every second reversal of the filter which would otherwise be obtained when he pushes the filter change button on the electronics package. When he has completed his review he need only restore the system to its original configuration and the automatic viewing will continue.

If it is desired to employ the projector without program control by a tape, the shuttle manual mode change switch can be opened and the shuttle automatic mode switch closed. In this condition of the invention, the changing of filters will occur at regular intervals according to the time settings of the time circuits. Slide changes will be effected for every second filter change.

From the foregoing, one can readily recognize the advantages provided by the present invention. In addition to nominal cost and utility with a wide variety of commerically available projection and recording equipment, the present invention can be operated by the relatively inexperienced. It permits a selection of modes of operation, and allows prolonged study of certain slides or portions thereof, whenever desired.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:
1. A projection system comprising:
 a projector for optically projecting images from slides and including a slide changer, and a remote control input for slide change signals;
 filtering means at the front of said projector and including filters and a filter changer, for filtering light projected from said projector;
 filter operated switches in said filtering means, various ones of said switches being coupled to a source of electrical energy and operable by said filters in selected positions of said filters;
 a first timer circuit coupled to the first of said switches for energization of said circuit by closure of said first switch by said filters upon movement of said filters to a first position,
 said first timer circuit including a first timer operated switch coupled to said source and closable by said circuit at a predetermined time after energization of said circuit;
 a second of said filter operated switches coupled to said source of electrical energy through the serial combination of said first timer operated switch and a filter automatic mode switch, said second switch being coupled to a first direction drive terminal of said filter changer whereby said second switch enables the driving of said filters from said first position to a second position;
 a second timer circuit coupled to a third of said filter operated switches for energization of said second circuit by closure of said third switch by said filters upon movement of said filters to said second position,
 said second timer circuit including a second timer operated switch coupled to said source and closable by said second circuit at a predetermined time after energization of said second circuit;

a fourth of said filter operated switches coupled to said source of electrical energy through the serial combination of said second timer operated switch and said filter automatic mode switch, and said fourth switch being coupled to a second direction drive terminal of said filter changer whereby said fourth switch enables the driving of said filters from said second position to said first position;

a third timer operated switch controlled by said second timer circuit and coupled to said source of electrical energy and coupled through a fifth of said filter operated switches to the remote control input of said projector to effect a change of slides when said filters move from said second position to said first position;

a two-position electrically operated switch having a movable contactor coupled through a filter manual mode switch to said source of electrical energy and having a first fixed contactor coupled through said second filter operated switch to said first terminal of said filter changer and engageable by said movable contactor for changing said filters from said first position to said second position, and having a second fixed contact coupled through said fourth filter operated switch to said second terminal of said filter changer and engageable by said movable contactor to change said filters from said second position to said first position, said electrically operated switch having an operating circuit coupled to said source of electrical energy, and including a normally-open manual switch for changing said filters, and said circuit having signal input lines connected across said normally open manual switch;

and a record reproducer having a signal output coupled to said signal input lines to change positions of said filters according to pre-recorded signals, when said filter manual mode switch is closed and said filter automatic mode switch is open.

2. A projection system comprising:
a projector for optically projecting images from slides and including a slide changer, and a remote control input for slide change signals;

filtering means on said projector and including filters and a filter changer, for filtering light projected from said projector;

filter operated switches in said filtering means, various ones of said switches being coupled to a source of electrical energy and operable by said filters in selected positions of said filters;

a first timer circuit coupled to the first of said switches for energization of said circuit by closure of said first switch by said filters upon movement of said filters to a first position, said first timer circuit including a first timer operated switch coupled to said source and closable by said circuit at a predetermined time after energization of said circuit;

a second of said filter operated switches coupled to a source of electrical energy through the serial combination of said first timer operated switch and a filter automatic mode switch, and said second switch being coupled to a first direction drive terminal of said filter changer whereby said second switch enables the driving of said filters from said first position to a second position;

a second timer circuit coupled to a third of said filter operated switches for energization of said second circuit by closure of said third switch by said filters upon movement of said filters to said second position, said second timer circuit including a second timer operated switch coupled to said source and closable by said second circuit at a predetermined time after energization of said second circuit;

a fourth of said filter operated switches coupled to said source of electrical energy through the serial combination of said second timer operated switch and said filter automatic mode switch, and said fourth switch being coupled to a second direction drive terminal of said filter changer whereby said fourth switch enables the driving of said filters from said second position to said first position;

a third timer operated switch controlled by said second timer circuit and coupled to said source of electrical energy and coupled to the remote control input of said projector to effect a change of slides when said filters move from said second position to said first position;

an electrically operated switch having contactors coupled through a filter manual mode switch to said source of electrical energy and coupled to said filter changer and operable in a first switched condition to change said filters from said first position to said second position, and operable in a second switched condition to change said filters from said second position to said first position, said electrically operated switch having an operating circuit coupled to said source of electrical energy, and including a normally open manual switch for changing said filters by closing said normally open switch manually, and said circuit having signal input lines connected across said normally open manual switch;

and a record reproducer having a signal ouput coupled to said signal input lines to change positions of said filters according to pre-recorded signals, when said filter manual mode switch is closed and said filter automatic mode switch is open.

3. A projection system comprising:
a projector for optically projecting images from slides and including a slide changer;

filtering means on said projector and including a filter and a filter changer, for filtering light projected from said projector;

a filter operated switch in said filtering means, said switch being coupled to a source of electrical energy operable by said filters in a selected position of said filter;

a timer circuit coupled to said switches for energization of said circuit by closure of said switch by said filter upon movement of said filter to one position, said timer circuit including a first timer operated switch coupled to said source and closable by said circuit at a predetermined time after energization of said circuit;

said first timer operated switch being coupled to said filter changer whereby closure of said first timer operated switch causes said filter changer to change said filter from said one position to another position;

an electrically operated switch having contactors coupled through a filter manual mode switch to said source of electrical energy and coupled to said filter changer and operable in a first switched condition to change said filters from said one position to said another position, said electrically operated switch having an operating circuit coupled to said source of electrical energy, and including a normally open switch operable for changing said filters.

4. A projection system comprising:
a projector for optically projecting images from slides and including a slide changer;

filtering means on said projector and including a filter and a filter changer, for filtering light projected from said projectors;

a filter operated switch in said filtering means, said switch being coupled to a source of electrical energy and operable by said filter in a selected position of said filter;

a timer circuit coupled to said switch for energization of said circuit by closure of said switch by said filter upon movement of said filter to one position, said timer circuit including a first timer operated switch coupled to said source and closable by said circuit at a predetermined time after energization of said circuit, said first timer operated switch being coupled to said filter changer whereby closing of said first timer operated switch causes said filter changer to change said filter from said one position to another position;

and a second timer operated switch controlled by said timer circuit and coupled to said source of electrical energy and coupled through a second filter operated switch to said slide changer to effect a change of slides when said filter moves from said one position to said another position.

5. In a projection apparatus adapted to project images from slides and having filters to slectively filter projected light, a control system comprising:
   a filter changer;
   a slide changer;
   an input for a source of electrical energy;
   filter position sensing switches operable by said filters;
   a first timer circuit coupled through a first of said switches to said input and coupled to said filter changer,
   said first timer circuit being energized by closure of said first switch by said filters in a first position thereof to operate said filter changer at a predetermined time after energization by said first switch;
   a second timer circuit coupled through a second of said switches to said input and coupled to said filter changer,
   said second timer circuit being energized by closure of said second switch by said filters in a second position thereof to operate said filter changer at a predetermined time after energization of said second circuit.

6. In a projection apparatus adapted to project images from slides and having a filter to selectively filter projected light, a control system comprising:
   a filter changer;
   a slide changer;
   an input for a source of electrical energy,
   a filter position sensing switch operable by said filter in a selected position of said filter;
   and a timer circuit coupled through said switch to said input and coupled to said filter changer,
   said timer circuit being energized by closure of said switch by said filter in said selected position to operate said filter changer to move said filter from said position at a pretermined time after energization by said switch.

7. In a projection system including an optical projector, the combination comprising:
   a filter unit mounted on the front of said projector in the path of projected light flowing from said projector and having a pair of filters with different light transmitting characteristics;
   a movable filter unit support for moving said filter unit to a first position locating one of said filters in said light path and to a second position locating the other of said filters in said light path,
   a support driver to drive said support from said first position to said second position;
   and control circuitry including a timer;
   and timer operated switch means coupled to said timer and disposed in circuits with a source of potential and said support driver to energize said driver upon closure of said switch means by said timer;
   said control circuitry further including support position sensing switch means operable by said support and in circuit with a source of potential and said timer to energize said timer upon arrival of said support at a predetermined position.

References Cited by the Examiner
UNITED STATES PATENTS

| | | | |
|---|---|---|---|
| 1,218,082 | 3/17 | Hall | 40—130 |
| 1,313,587 | 8/19 | Douglass | 352—46 X |
| 1,681,776 | 8/28 | McDonnell | 352—81 |
| 2,309,879 | 2/43 | Willis | 352—58 |

NORTON ANSHER, *Primary Examiner.*

WILLIAM MISIEK, *Examiner.*